(12) United States Patent
Visscher

(10) Patent No.: US 6,184,487 B1
(45) Date of Patent: Feb. 6, 2001

(54) ELECTRODE INSPECTION SYSTEM

(76) Inventor: Paul R. Visscher, 6283 136th Ave., Saugatuck, MI (US) 49453

( * ) Notice: Under 35 U.S.C. 154(b), the term of this patent shall be extended for 0 days.

(21) Appl. No.: 09/237,410

(22) Filed: Jan. 26, 1999

(51) Int. Cl.[7] .............. B23K 11/30; G01M 3/02
(52) U.S. Cl. .............................. 219/91.1; 73/37.5
(58) Field of Search ........................ 219/119, 120, 219/91.1, 109, 86.41; 73/37, 37.5, 37.8

(56) References Cited

U.S. PATENT DOCUMENTS

| | | | |
|---|---|---|---|
| 4,447,697 | * | 5/1984 | Dunne et al. ............ 219/86.41 |
| 5,814,720 | * | 9/1998 | Visscher ................. 73/37 |
| 6,026,838 | * | 2/2000 | Nicewonger et al. ..... 219/120 |

FOREIGN PATENT DOCUMENTS 9-61108  *  3/1997  (JP) .
94/09939  *  5/1994  (WO) ................. 219/119

* cited by examiner

Primary Examiner—Geoffrey S. Evans
(74) Attorney, Agent, or Firm—Malcolm R. McKinnon

(57) ABSTRACT

An improved inspection system for verifying that resistance welding electrodes have been properly dressed; that associated pairs of the electrodes are aligned with each other within predetermined tolerances; and that the pressure applied by a weld gun to the electrodes and material being welded is within predetermined standards. The system incorporates low pressure air apparatus that evaluates the back pressure resulting from the fit of collet geometry relative to the form of the electrode tip, and apparatus to verify the alignment of opposing electrodes with respect to each other and incorporating fiber-optic sensors that evaluate the alignment of collets with respect to each other. The system also provides apparatus for verifying that the proper pressure is applied to the workpieces by the electrodes during the welding operation.

18 Claims, 7 Drawing Sheets

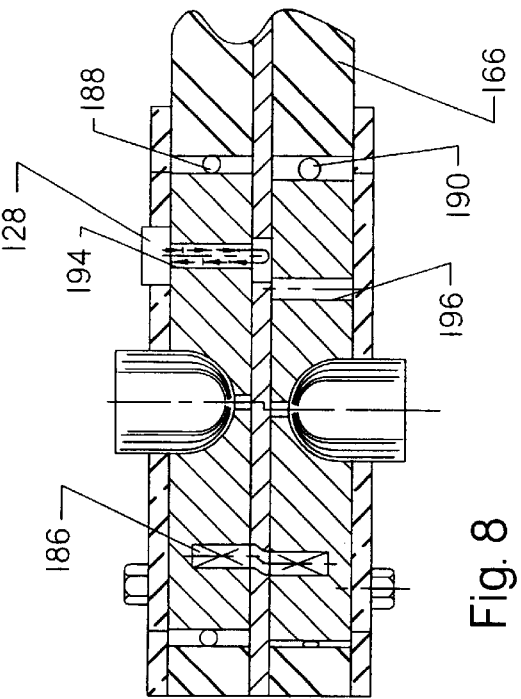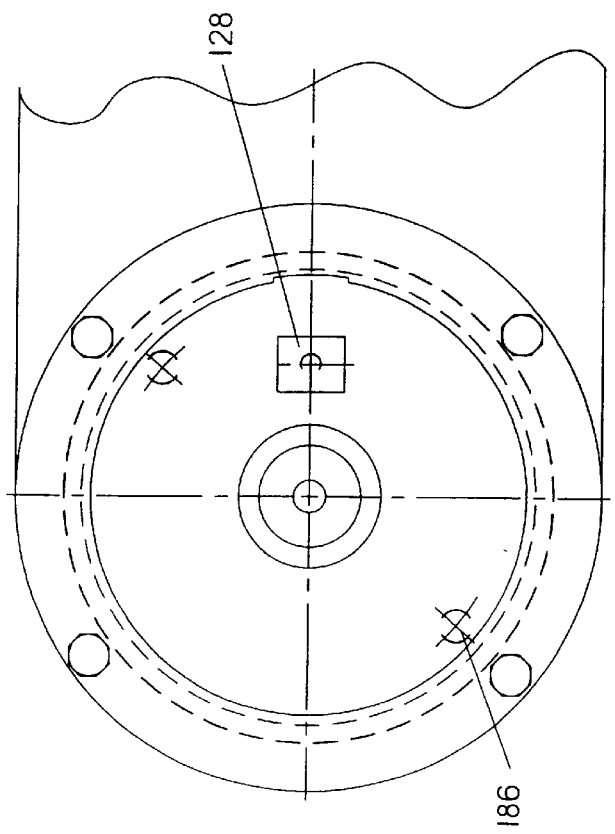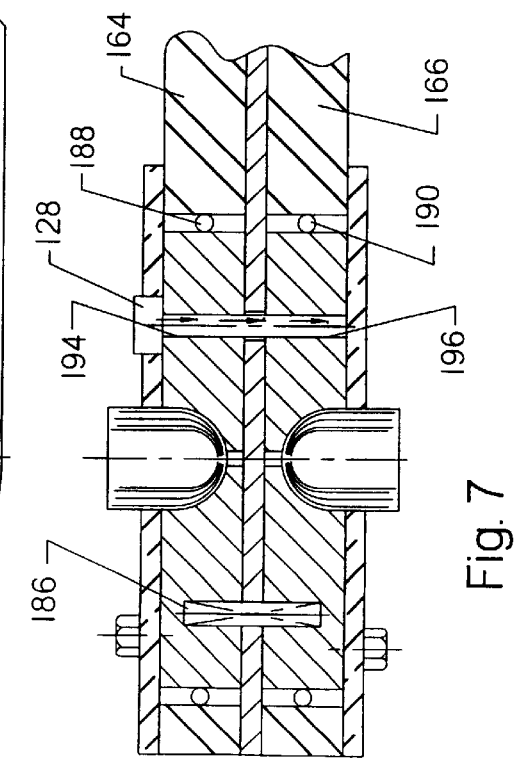

ELECTRODE INSPECTION SYSTEM

BRIEF SUMMARY OF THE INVENTION

This invention relates to systems for inspecting resistance welding electrodes and, more particularly, to an improved inspection system for verifying that resistance welding electrodes have been properly dressed by an electrode tip dresser; that associated electrodes when installed in a weld gun are aligned with each other within predetermined tolerances; and that the weld pressure provided by the weld gun is within predetermined tolerances.

As is well known in the art, during resistance welding processes the tips of the electrodes tend to mushroom (flatten) due to the pressures applied by the associated weld gun and the heat generated by the electrical current that passes through the electrode tips. Also, for example, in the case of welding galvanized steel, a build-up of the brass alloy will form on the surface of the electrode tips. Both of such conditions are causes of poor welds being produced. Consequently, the electrode tips must be dressed periodically to insure that the tip configuration is maintained within predetermined tolerances. As is also well known in the art, in automated welding systems the use of automatic electrode tip dressers has been developed. Although the automated tip dressers are reliable there are cases in which the electrode tips are not properly dressed or are not dressed at all, because of broken or dull dresser cutter blades or other factors.

It is also well known in the art of resistance welding that correct alignment of the electrode tips is essential for good tip life and quality of weld. Loss of alignment may indicate that some part of the weld gun or head is not tightly secured or the electrode shank may have become bent in operation. Electrode pressure applied by the weld tips to the workpiece is also very important in producing successful welds. If the weld pressure is not maintained within predetermined parameters and the pressure is greater than required to produce a good weld, a shortened tip life may result. On the other hand, if the pressure is less than required the weld electrodes may not bring the two sheets of workpiece material together so that a proper weld may be made. Electrode tips that are not properly dressed or that are not properly aligned or if the weld pressure is not correct can result in welds of poor quality, and in some cases no welds whatsoever are produced. Consequently, the resulting substandard parts can have various types of negative consequences, such as requiring the reworking of parts, added costs, necessity of parts sorting, possible liability issues, poor customer relations and other adverse consequences.

An object of the present invention is to overcome the aforementioned problems which can be created when the tips of resistance welding electrodes are not properly dressed or are not properly aligned or when an improper weld pressure is applied to the associated workpieces, and to provide an improved inspection system for verifying that resistance welding electrode tips have been properly dressed, properly aligned, and that proper weld pressure has been applied to the workpieces thereby reducing the risks involved in the spot welding of metal components, and also reducing the problems that can be caused by welding with electrodes having tips that are not properly dressed, or are not properly aligned, or without proper weld pressure being applied to the workpieces.

Another object of the present invention is to provide an improved inspection system incorporating novel low pressure air sensing means for evaluating welding electrode tip faces, physical shape and condition, and the relationship of such tips to predetermined criteria.

Another object of the present invention is to provide an improved inspection system incorporating low pressure air sensing means capable of simultaneously sensing two opposing electrode tips to evaluate the suitability thereof for continuing welding operations satisfying predetermined standards.

Another object of the present invention is to provide an improved inspection system embodying low pressure air sensing means incorporating interchangeable collets permitting the inspection of welding electrodes of various sizes and shapes merely by interchanging the collets.

Another object of the present invention is to provide an improved inspection system that permits two welding electrodes of different sizes and shapes to be inspected at the same time.

A further object of the present invention is to provide an improved inspection system for verifying that the tips of welding electrodes have been properly dressed, and which system is capable of being mounted in close proximity to an electrode tip dresser machine and/or a welding gun.

Another object of the present invention is to provide an improved inspection system for verifying that the tips of welding electrodes are in correct alignment with each other within predetermined criteria.

A further object of the present invention is to provide an improved inspection system for verifying that the pressure applied to the workpieces by the electrodes is correct in accordance with predetermined requirements.

Another object of the present invention is to provide an improved inspection system that will verify weld tip geometry, weld tip alignment and weld tip pressure all simultaneously.

A further object of the present invention is provide an improved inspection system that will provide an output signal to a machine controller respecting whether the electrode tips meet predetermined requirements concerning tip alignment, tip geometry and weld pressure.

Yet another object of the present invention is provide an improved inspection system that is relatively easy to manufacture and assemble at economical cost while providing long life and reliable operation.

The above as well as other objects and advantages of the present invention will become apparent from the following description, the appended claims and the accompanying drawings.

BRIEF DESCRIPTION OF THE DRAWINGS

FIG. 7 is a cross-sectional view of another embodiment of the invention and illustrating a light path when the weld electrodes are properly aligned;

FIG. 8 is a cross-sectional view similar to FIG. 7 and illustrating a light path when the weld electrodes are improperly aligned;

FIG. 9 is a top view of the structure illustrated in FIG. 7;

DETAILED DESCRIPTION

Figure 1:
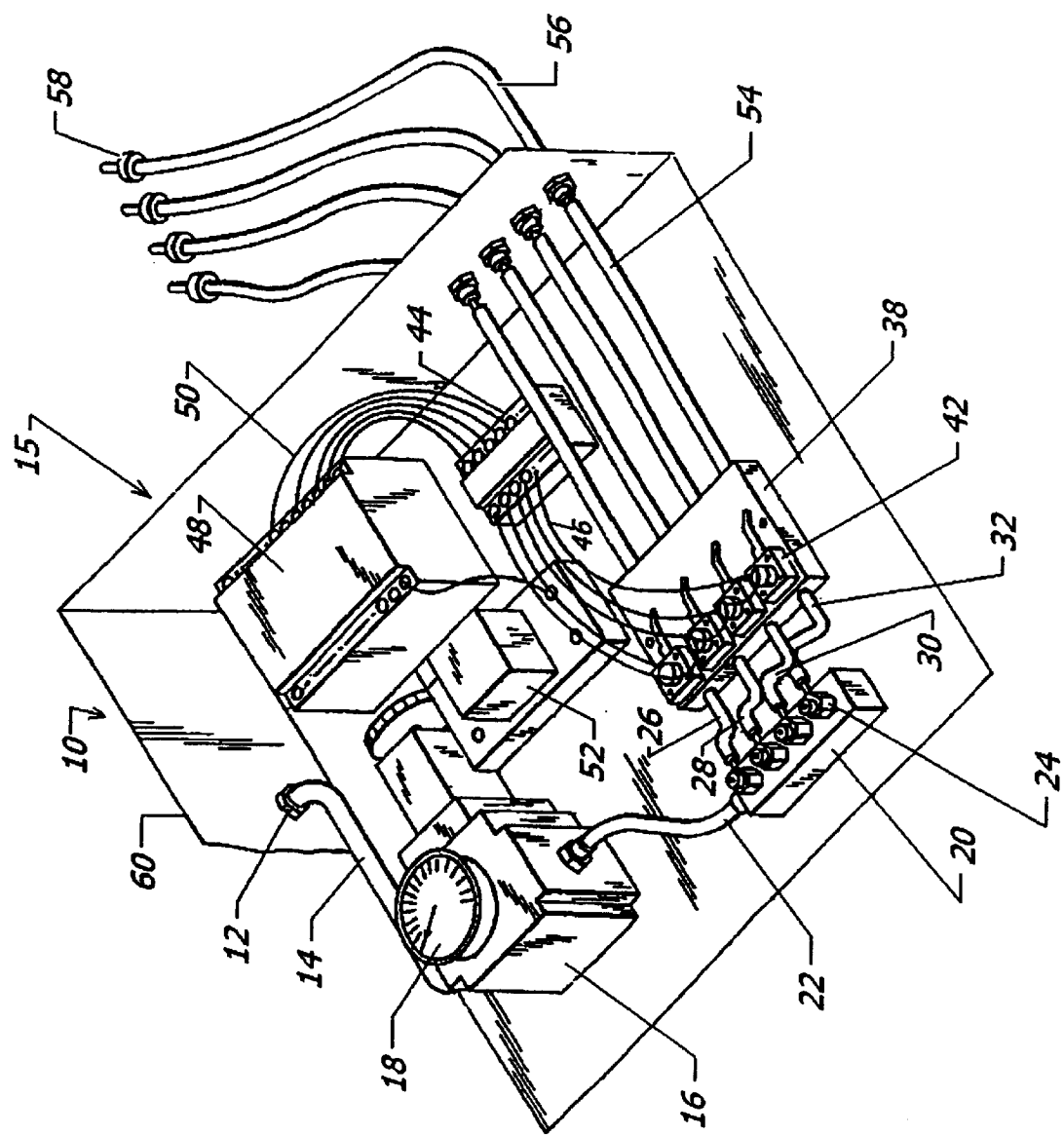
FIG. 1 is a schematic diagram of a control unit that may be used in the inspection system embodying the present invention.

Referring to the drawings, the present invention is illustrated as embodied in an inspection system, generally designated 10, which is particularly adapted for use in verifying that resistance welding electrodes have been properly dressed by an electrode tip dresser; that the electrode tip geometry is suitable for welding operations; that opposed electrodes are aligned with each other within predetermined tolerances; and that the weld gun applies the appropriate pressure to obtain a satisfactory spot weld, i.e. the weld pressure exerted by the weld gun meets predetermined criteria. It will be understood however that the present invention is also applicable to other uses.

Referring to FIG. 1 of the drawings, a control unit, generally designated 15, is illustrated therein that may be used in the inspection system 10. The control unit 15 may be of the type illustrated and described in U.S. Pat. No. 5,814,720, issued to the inventor of the present application on Sept. 29, 1998 for an Air Pressure Sensor Control System, and the entire disclosure of U.S. Pat. No. 5,814,720 is hereby incorporated herein by reference. The control unit 15 includes a bulkhead fitting 12 which is adapted to be connected to a suitable source of air pressure (not shown), the air pressure preferably being supplied at 60–120 PSIG with suitable air filtering whereby dirt particles and other foreign matter are removed from the incoming air. The air flows from the bulkhead fitting 12 through a hose 14 to a conventional air pressure regulator 16 incorporating a conventional air pressure gauge 18. The air pressure regulator functions to reduce the operating pressure required to operate the system to approximately 0.5 to 8 PSIG depending upon the particular application. The low pressure air is then delivered into a common port manifold 20 through the agency of a hose 22, the common port manifold being equipped with suitable needle valves, such as 24, from which the volume of air is then delivered via hoses, such as 26, 28, 30 and 32 to the inlet end portions of associated switch air passageways internally defined by an electro-pneumatic interface module 38, four such switch air passageways being internally defined by the electro-pneumatic interface module illustrated in FIG. 1 of the drawings.

The internal switch air passageways communicate with conventional pneumatic/electric switches 42 which are adapted to open and close as a function of variations in the air pressure in the switch air passageways. Each pneumatic/electric switch 42 (four such switches being illustrated in FIG. 1 of the drawings) is electrically connected to a terminal block 44 through the agency of wires, such as 46, the terminal block 44, in turn, being connected to a conventional programmable logic controller 48 by wires such as 50, a relay 52 being provided to relay appropriate signals to a welding machine or other equipment being controlled by the air pressure sensor control unit 15. The air entering the inlet of each switch air passageway flows through such passageway and exits the switch air passageway through hoses such as 54 and 56 to a terminal fitting, such as 58, connected to a sensor 116 as will be described hereinafter in greater detail.

Figure 2:
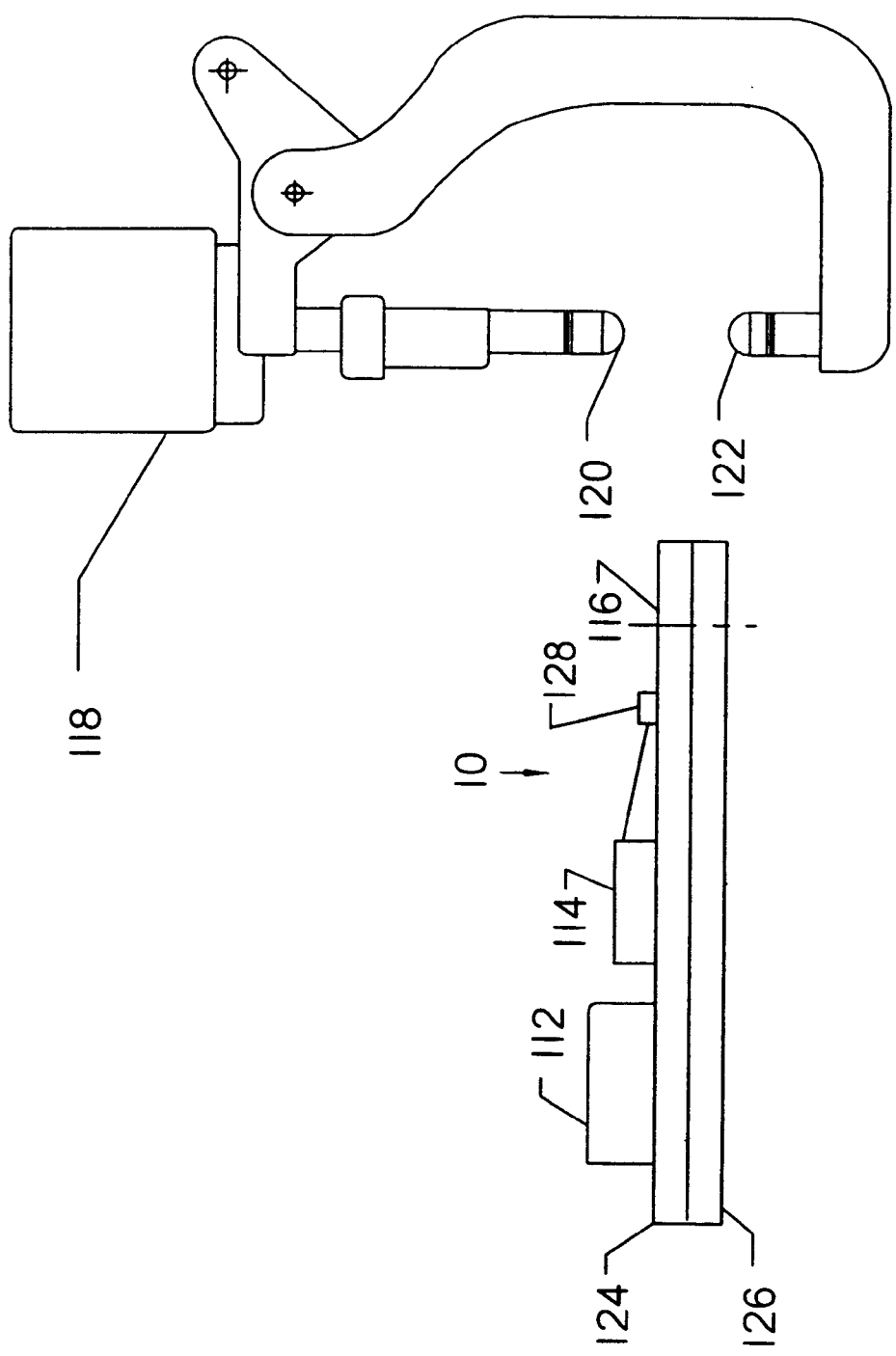
FIG. 2 is a schematic elevational view of a portion of the inspection system embodying the present invention, showing the same in relationship with respect to a welding gun having opposed welding electrodes.

A conventional weld gun 118 is schematically illustrated in FIG. 2 of the drawings, the gun having an upper electrode 120 and a lower electrode 122 which cooperate with each other to resistance weld workpieces disposed between the electrodes 120 and 122 which must be properly dressed through the agency of an automatic electrode tip dresser or other suitable dresser means. The inspection system 10 embodying the present invention may be mounted in close proximity to the weld gun 118 as illustrated in FIG. 2 of the drawings, or the inspection system may be mounted on a dresser machine framework or on a separate pedestal as desired.

In addition to the control unit 15, previously described, the inspection system 10 includes a sensor 116 which is connected by air hoses, such as 56, to the control unit 15. The sensor 116 includes a high precision combined light generating and reflected light sensing unit 114 which may be of the type commercially identified as "STM Sensor Incorporated," Model V6A Optic Amplifier, available from Industrial Control, Inc., Zeeland, Mich. 49464. The unit 114 has a light generating and reflected light cable head 128 effective to detect misalignment of the electrodes as will be described hereinafter in greater detail. A force load cell 182 is also provided which may be identified as "Cooper Instruments and Systems," Model LZBS 1010 2K, also available from Industrial Control, Inc., Zeeland, Mich. 49464.

The sensor 116 includes a top plate 124 and a bottom plate 126, and the sensor 116 is connected to a manifold 112 by air passageways in the top plate 124 and bottom plate 126, respectively. Inlet ports such as 142 and 143 on the side of the manifold 112 are connected by air hoses, such as 56, to the control unit 15. Means is also provided for back pressure developed at the sensor 116 to be communicated to the control unit 15. The air entering the passageways 173A and 173B and 175A and 175B defined by the sensor 116 flows through such passageways and exits to atmosphere if there is no obstruction of orifices defined by the sensor 116, as will be described hereinafter in greater detail. If there is an obstruction of an orifice, the air will be blocked from exiting the sensor 116 whereupon the associated pneumatic/electric switch 42 will be actuated due to the increase in back pressure thereby providing a circuit to the programmable logic controller 48, the programmable logic controller, in turn, controlling a welding machine or other equipment through the agency of the relay 52. It should also be understood that the air volume for each air passageway in the sensor 116 may be adjusted through the agency of the needle valves 24 which control the flow of air through the common port manifold 20. It should also be pointed out that, if desired, the main components of the control unit 15 may be housed in a conventional NEMA enclosure 60 with the hoses 56 projecting from the enclosure 60.

Figure 3:
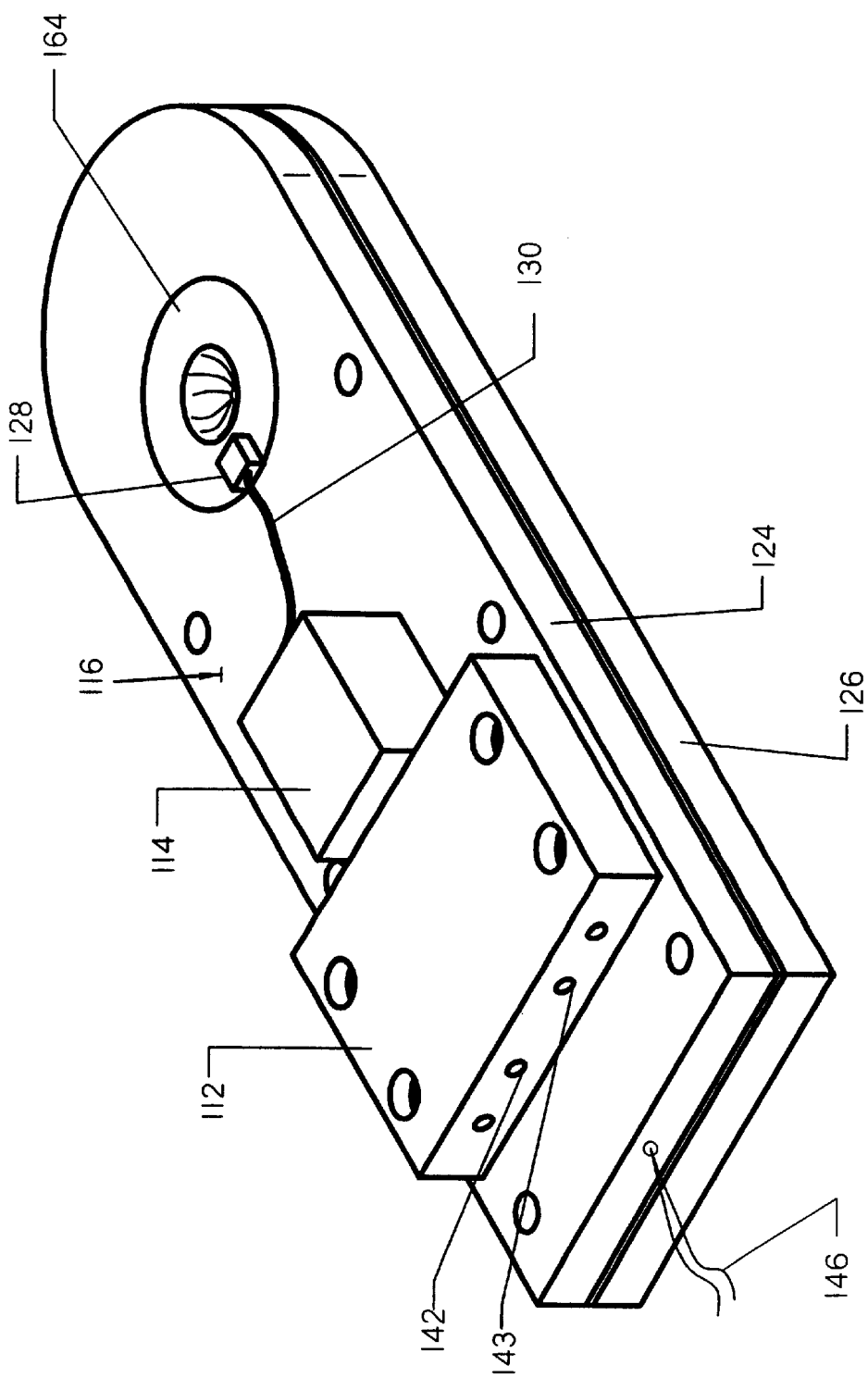
FIG. 3 is an enlarged perspective view of components of the inspection system illustrated in FIG. 2.

As shown in the drawings, the sensor 116 includes a pair of interchangeable collets 164 and 166 which are mounted on one end portion of the elongated mounting plates 124 and 126 and retained therein through the agency of retainer rings 136 and 137, respectively, secured to the mounting plates 124 and 126, as by screws 138 as illustrated. The mounting plates 124 and 126 are preferably made of aluminum or of any other suitable material having sufficient strength to withstand the forces exerted thereon. As shown in FIGS. 2 and 3 of the drawings, the other end portions of the mounting plates support the amplifier 114 and the manifold 112.

Figure 4:
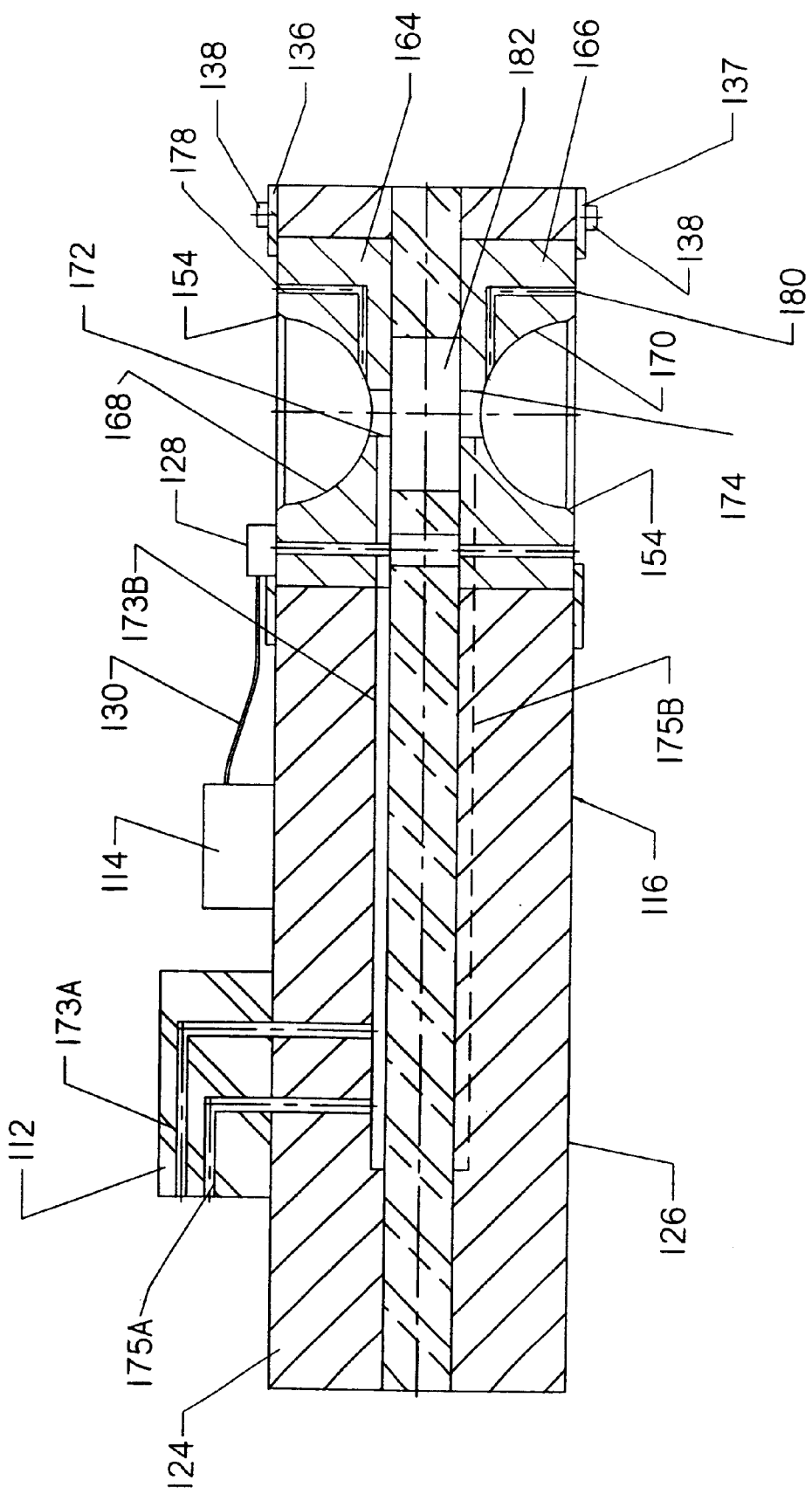
FIG. 4 is a longitudinal, sectional view of portions of the structures illustrated in FIGS. 2 and 3.

The collets 164 and 166 define concave cavities 168 and 170 of a configuration that is complementary to the face of the tip of the particular electrode being inspected. It will be understood that there are numerous sizes and shapes of welding electrodes that can be used in resistance welding processes, and the collets 164 and 166 are preferably made of hardened steel to resist wear and also withstand the forces applied thereto. As shown in FIG. 4, the collets preferably have a taper 154 at the mouth side thereof to assist in aligning the electrodes with the shaped cavity in the collets. As shown in the drawings, the collets 164 and 166 define a pair of passageways 172 and 174. One end of the passageway 172 communicates with the cavity 168 while the other end of the passageway 172 communicates with a passageway 173B connected to the control unit 15 by the passageway 173A and a hose 56. One end of the passageway 174 communicates with the cavity 170 while the other end of the passageway 174 communicates with a passageway 175B which in turn is connected to the control unit 15 by the passageway 175A and a hose 56. When the electrode is properly dressed it will restrict the flow of air through the passageways 178 and 180 thereby causing an increase in back pressure in the sensor back to the control unit 15. The vents 178 and 180 provided in each of the collets allow air to escape to the atmosphere if an electrode tip is not properly dressed and therefore will not create an increase in back pressure within the control system.

As is well known in the art, standard welding electrodes are supplied in different diameters and different tip geometries, and special shapes are often produced to meet specific requirements. The inspection system embodying the present invention requires that only the collets need to be changed to match the selected electrodes required for any particular welding application. It will be understood that both of the collets may be of the same configuration or may be of different configurations or they may be matched to any combination of electrodes as required by the particular welding operation.

As is well known in the art, the electrodes 120 and 122 must be aligned with each other to obtain a satisfactory weld. As shown in FIGS. 4, 7 and 8, light emitted from 128 will pass through the passageways 194 and 196 if the electrodes are aligned within predetermined values. When the electrodes are disposed in the cavities 168 and 170 and are misaligned, the collets are allowed to shift laterally within the mounting plates causing a misalignment between the passageways 194 and 196. The light generated by the cable head 128 will be reflected by the surface of the collet 166 and through the associated passageway 194 back to the cable head 128 and thereafter will be transmitted back to the amplifier 114. The unit 114 will provide an output to the machine controller (not shown) so that in a conventional manner the machine controller can sound an alarm and/or shut down the welding operation and/or otherwise alert the user thereof that the electrode alignment did not pass inspection.

As previously mentioned, the collets 164 and 166 are enabled to shift laterally in relationship to each other. Alignment springs, such as 186, each in the form of a flexible plug are provided which allow the collets 164 and 166 to reposition themselves when a dislocation force is applied and will return the collets 164 and 166 back to center line with each other when the dislocation force is removed. "O" rings 188 and 190 are provided to maintain the collets on center line within the sensor 116. When a dislocation force is applied the "O" rings 188 and 190 will collapse and the "O" ring portion on the opposite side of the collet will expand. When the dislocation force is removed the two collets 164 and 166 will return to their neutral position on center line of the sensor 116. The fiber optic cable head 128 emits a light beam which beam passes through the passageways 194 and 196. If the collets 164 and 166 are aligned within predetermined tolerances no output signal will be made. If the collets 164 and 166 are misaligned beyond the acceptable tolerances the light beam emitted from the passageway 194 will impinge on the adjacent surface of the collet 166. The light is reflected by such surface back through the passageway 194 to the cable head 128 and transmitted back to the unit 114 through the cable 130 and an output signal will be sent to the machine controller.

As is well known in the art, the force of the electrodes bearing on the sheet metal must be maintained with respect to predetermined values. If the force is less than required, the electrodes may not bring the two sheets together so that a weld may be made. If the pressure is too high, the tip of the electrode will mushroom at a faster rate and may also cause excessive indentations in the surface of metal being welded. The embodiment of the invention illustrated in FIG. 4 includes a force sensor 182 positioned between the collets 164 and 166, during inspection of the electrodes, the electrodes 120 and 122 are disposed in the cavities 168 and 170 defined by the collets 164 and 166. Pressure is then applied by the weld gun as if it were in the weld position. The value of the force applied by the collets 164 and 166 to the force sensor 182 is transmitted by the cable 146 to a conventional amplifier and digital display (not shown) in the machine controller for evaluation by the machine operator.

Figure 5:
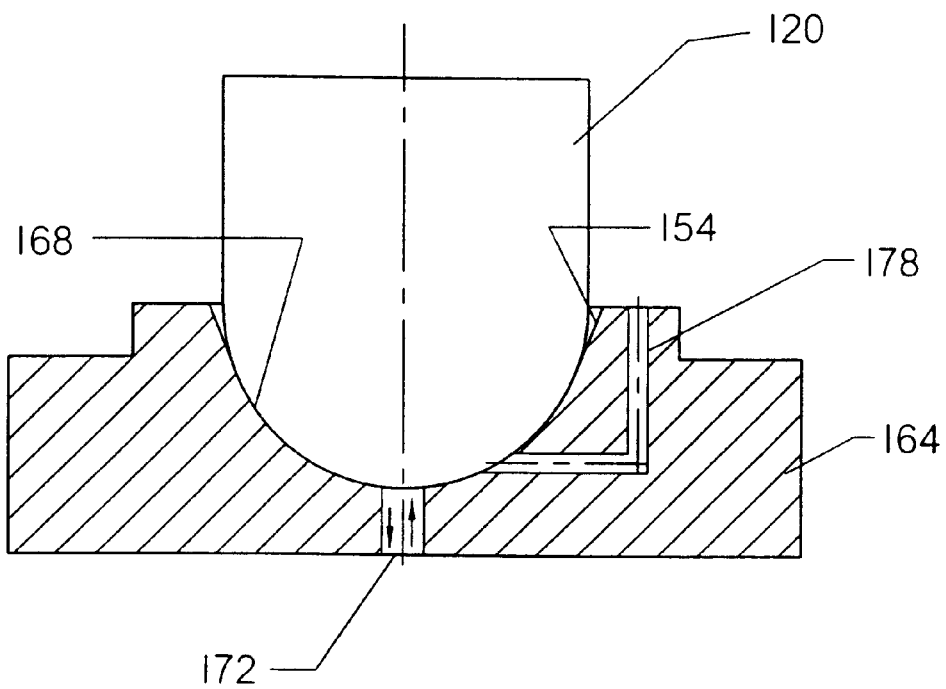
FIG. 5 is a cross-sectional view of a portion of the structure illustrated in FIG. 4 and illustrating a properly dressed welding electrode tip inserted therein.
Figure 6:
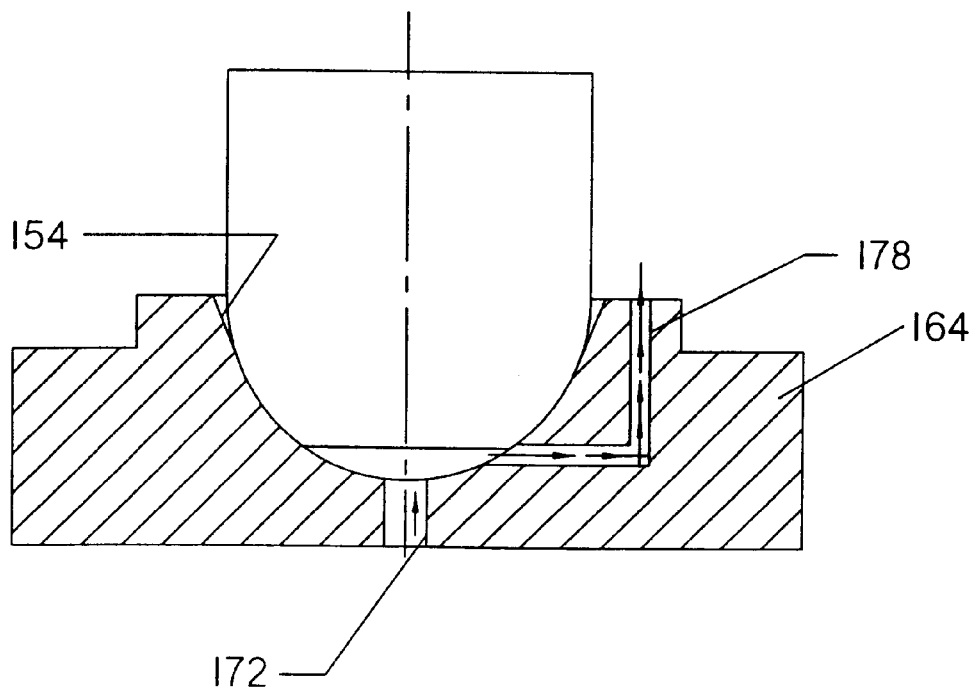
FIG. 6 is a cross-sectional view similar to FIG. 5 and illustrating an improperly dressed electrode tip inserted therein.

FIG. 5 illustrates the manner in which a properly dressed electrode blocks the passageway 172 and the entrance to the passageway 178 thereby preventing the escape of air to atmosphere through the passageway 178 and providing a circuit to the programmable logic controller 48 in the manner previously described. FIG. 6 illustrates the condition in which an improperly dressed electrode fails to block the passageway 172 and the entrance to the passageway 178 thereby permitting air to escape to atmosphere through the passageway 178 with the result that there will not be an increase in the air back pressure which can be communicated to the unit 15 in the manner previously described.

Figure 10:
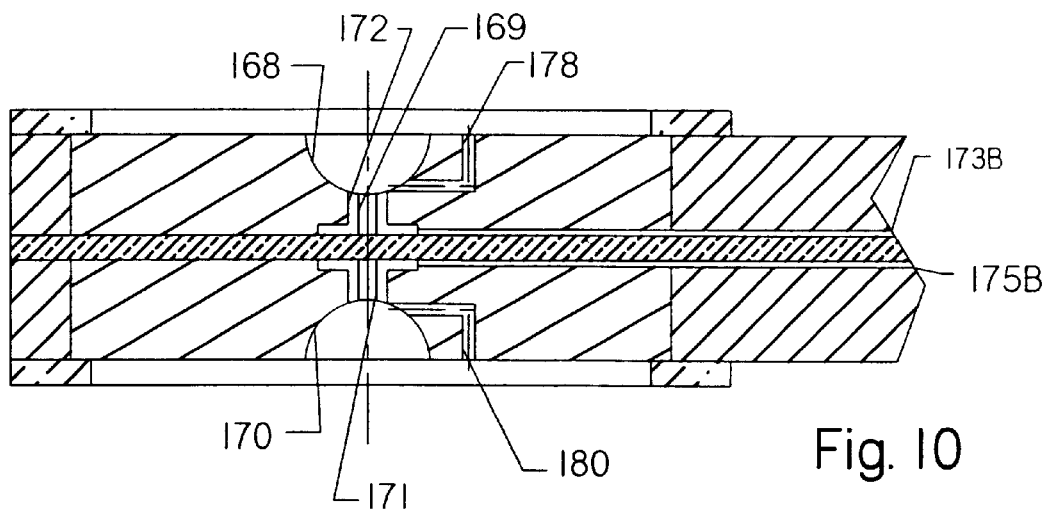
FIG. 10 is a sectional view of another embodiment of the invention incorporating a support column to control the depth of penetration of an electrode if the face thereof is too small.

FIG. 10 illustrates an embodiment of the invention wherein support pins 169 and 171 are provided to control the depth of penetration of an electrode into the cavities 168 and 170 if the face of the electrode is too small. This prevents the passageways 172 and 174 from being restricted, and air will flow through the passageways 178 and 180 to atmosphere in the manner previously described.

Figure 11:
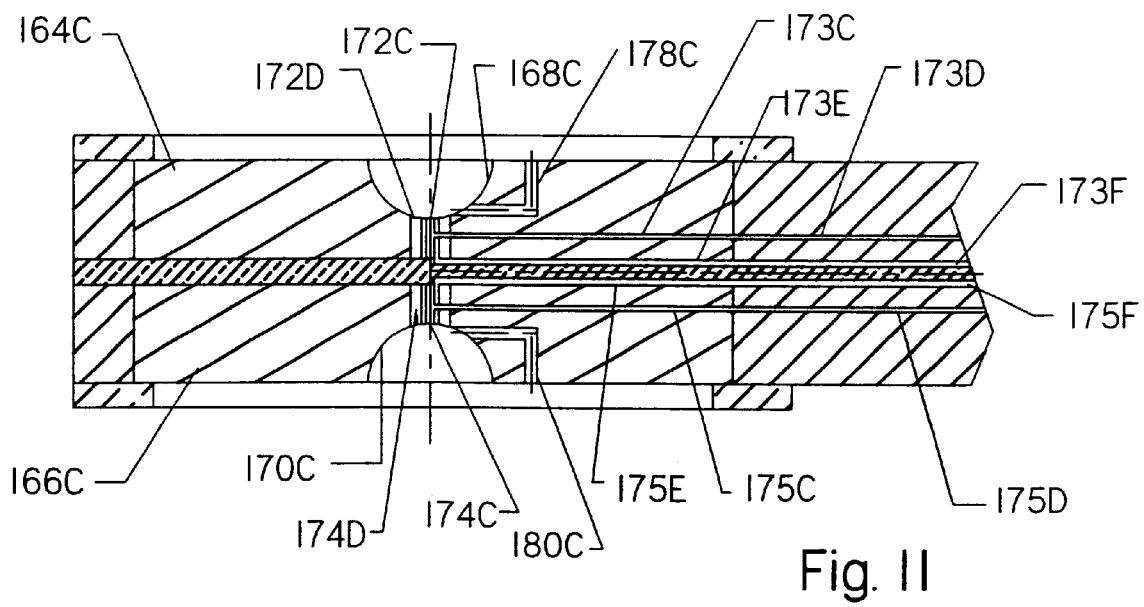
FIG. 11 is a sectional view of another embodiment of the invention having a pair of collets incorporating a secondary air passageway in each collet to verify the diameter of the electrode tip.
Figure 12:
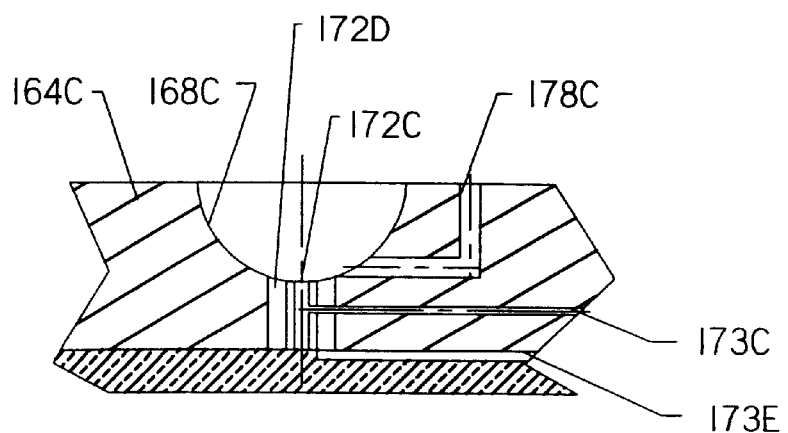
FIG. 12 is an exploded sectional view of a portion of the structure illustrated in FIG. 11.

In the embodiment of the invention illustrated in FIGS. 11 and 12, collets 164C and 166C are provided, the collet 164C defining concentric air passageways 172C and 172D communicating with the cavity 168C while the collet 166C defines concentric air passageways 174C and 174D communicating with the cavity 170C. The collet 164C also defines an air passageway 178C one end of which communicates with the cavity 168C while the other end of the passageway 178C communicates with atmosphere. The collet 166C also defines an air passageway 180C one end of which communicates with the cavity 170C while the other end of the passageway 180C communicates with atmosphere.

In this embodiment of the invention, as shown in FIGS. 11 and 12, the collet 164C defines an air passageway 173C one end of which communicates with the air passageway 172C while the other end of the passageway is connected to the control unit 15 through the passageway 173D. The collet 164C also defines an air passageway 173E one end of which communicates with the passageway 172D while the other end of the passageway 173E is connected to the control unit 15 through the passageway 173F. The collet 166C defines an air passageway 175C one end of which communicates with the passageway 174C while the other end of the passageway 175C is connected to the control unit 15 through the passageway 175D. The collet 166C also defines an air passageway 175E one end of which communicates with the passageway 174D while the other end of the passageway 175E is connected to the control unit 15 through the passageway 175F.

In this embodiment of the invention if the tip of an electrode inserted in the cavity 168C blocks the passageway 172D, such blockage indicates that the tip is too large, and such blockage is communicated to the control unit 15 through the passageways 173E and 173F in the manner previously described, the control unit 15 in turn being programmed so as to indicate that the tip of the electrode has blocked the passageway 172D. On the other hand, if the tip of an electrode inserted in the cavity 168C blocks the passageway 172C, such blockage indicates that the electrode is properly dressed as described herein above. It will be understood that similar results will be obtained if the tip of an electrode is inserted in the cavity 170C, the manner of operation of the collet 166C and the associated structure described hereinabove will correspond with the manner of operation of the collet 164C and the associated structure described hereinabove.

While preferred embodiments of the invention have been illustrated and described, it will be understood that various changes and modifications may be made without departing from the spirit of the invention.

What is claimed is:

1. An electrode inspection system for verifying that a resistance welding electrode has been dressed to predetermined tolerances, said inspection system comprising, in combination, sensor means defining a cavity adapted to receive a tip portion of a welding electrode, said sensor means defining first and second air passageways, one end portion of said first air passageway communicating with said cavity, the other end portion of said first air passageway being connectable to a source of low pressure air, one end portion of said second air passageway communicating with said cavity, the other end portion of said second air passageway communicating with atmosphere, and means effective to determine whether low pressure air applied to said first air passageway passes through said cavity and said second air passageway to atmosphere.

2. The combination as set forth in claim 1, said sensor means including collet means defining said cavity and said first and second air passageways.

3. The combination as set forth in claim 1, said sensor means defining multiple cavities for simultaneously inspecting a pair of electrodes.

4. The combination as set forth in claim 1, said sensor means including means for simultaneously inspecting a pair of electrodes having different tip portion configurations.

5. The combination as set forth in claim 2 including a mounting plate, said mounting plate supporting said collet means.

6. The combination as set forth in claim 1, the configuration of said cavity being substantially the complement of the configuration of the tip portion of a welding electrode being inspected.

7. The combination as set forth in claim 2, said sensor means including multiple collet means defining multiple cavities each adapted to receive the tip portion of a welding electrode.

8. The combination as set forth in claim 7 including means for determining whether said multiple cavities are aligned with each other within predetermined criteria.

9. An electrode inspection system for verifying that resistance welding electrodes have been dressed to predetermined tolerances, said system comprising, in combination, sensor means defining a cavity adapted to receive a tip portion of a welding electrode, said sensor means defining first and second air passageways, one end of said first air passageway communicating with said cavity, the other end portion of said first air passageway being connectable to a source of low pressure air, one end portion of said second air passageway communicating with said cavity, the other end portion of said second air passageway communicating with atmosphere, and means effective to determine the back pressure of the low pressure air in said first air passageway.

10. The combination as set forth in claim 9 including means for limiting the movement of a tip portion of a welding electrode into the cavity defined by said sensor means.

11. The combination as set forth in claim 9, said sensor means including collet means defining said cavity and said first and second air passageways.

12. The combination as set forth in claim 11, the configuration of said cavity being substantially the complement of the configuration of the tip portion of a welding electrode being inspected.

13. The combination as set forth in claim 9, said sensor means including multiple collet means defining multiple cavities each adapted to receive the tip portion of a welding electrode.

14. The combination as set forth in claim 13 including means for determining the amount of pressure applied to said multiple collet means by the tip portions of welding electrodes.

15. The combination as set forth in claim 13 including load cell means effective to determine the amount of force applied to said multiple collet means by the tip portions of welding electrodes being inspected.

16. An inspection system for verifying that a resistance welding electrode has been dressed to predetermined criteria, said system comprising, in combination, sensor means including a pair of collets each defining a cavity adapted to receive a tip portion of a welding electrode, said collets being disposed in aligned relationship and being movable with respect to each other, said collets defining light passageways normally disposed in aligned relationship, said sensor means including light generating and reflected light sensing means, means effective to transmit light through said light passageways defined by said collets, means effective to transmit light reflected by one of said collets through the light passageway defined by the other of said collets, and means effective to determine whether the reflected light received by said light sensing means meets predetermined values.

17. The combination as set forth in claim 16 including resilient means biasing said collet means toward an aligned relationship.

18. The combination as set forth in claim 16, said sensor means including a mounting plate supporting said collet means and said light generating and reflected light sensing means.

\* \* \* \* \*